July 14, 1942.                C. W. CRUMRINE                2,289,827
                    FILM WINDING AND INDICATING MECHANISM
                    Filed Jan. 23, 1941            2 Sheets-Sheet 1
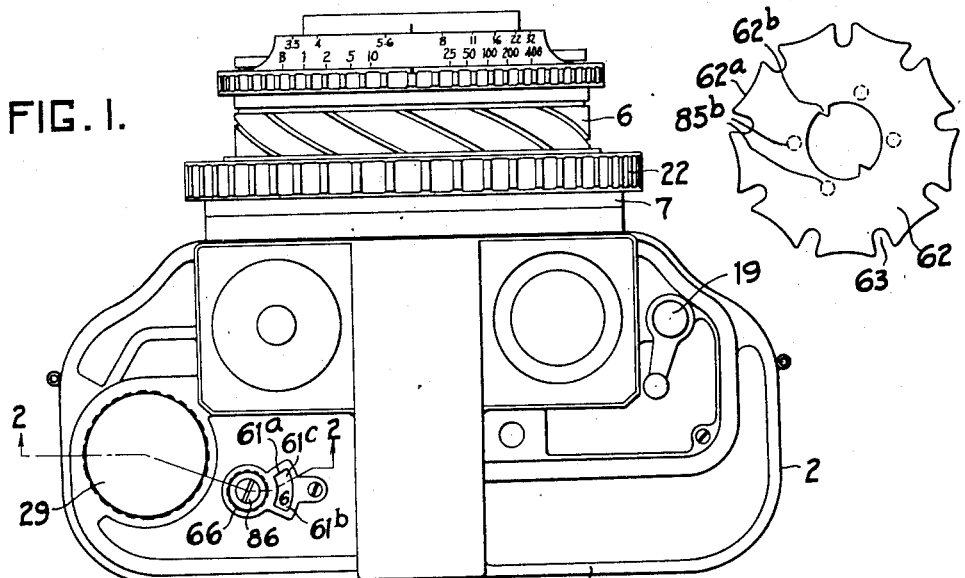
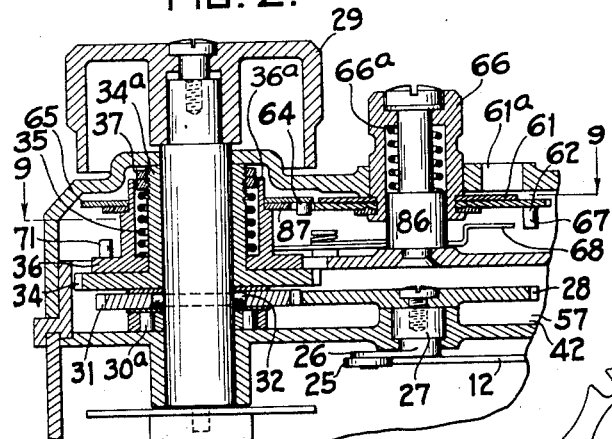
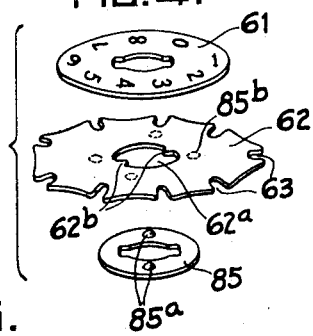
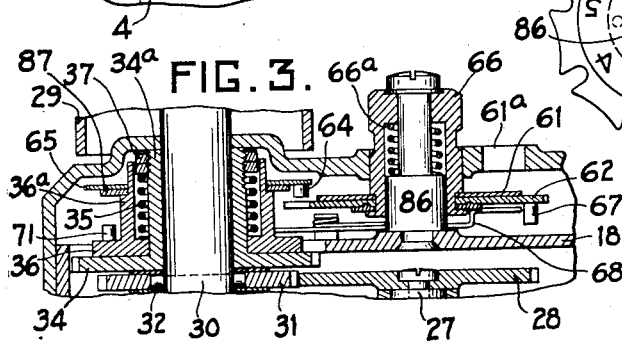
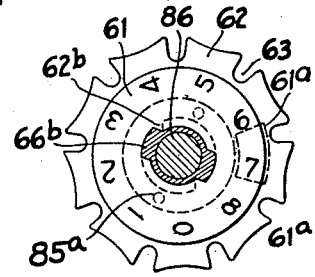
CHESTER W. CRUMRINE
*INVENTOR*
BY
*ATTORNEYS*

July 14, 1942.  C. W. CRUMRINE  2,289,827
FILM WINDING AND INDICATING MECHANISM
Filed Jan. 23, 1941  2 Sheets-Sheet 2
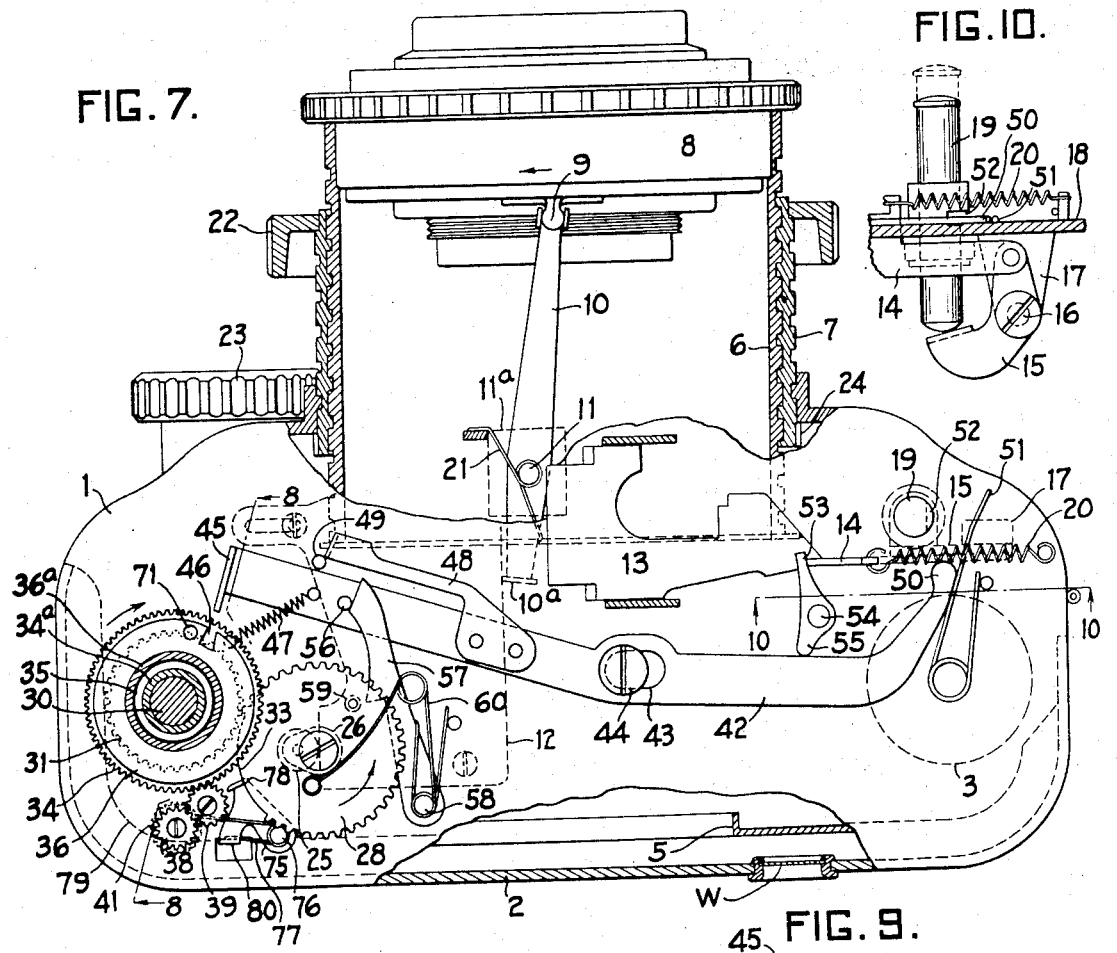
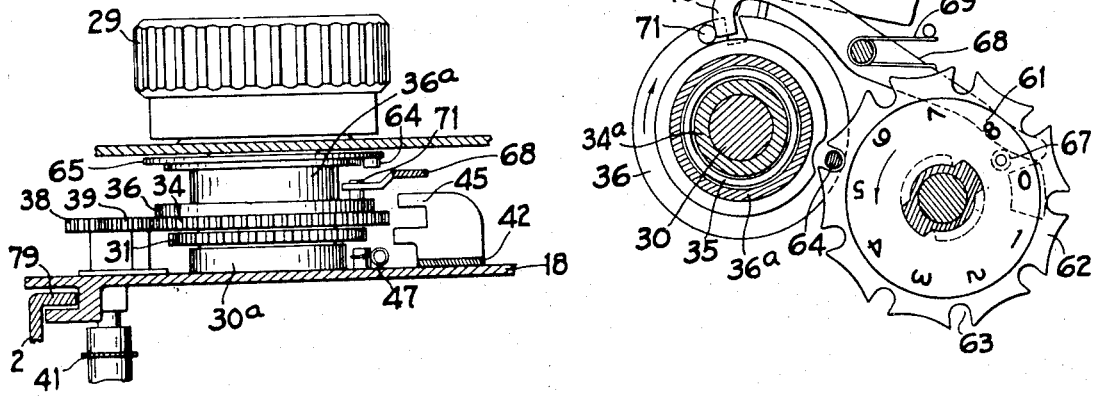
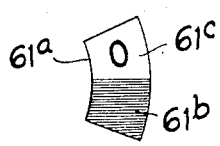
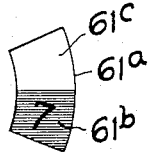
CHESTER W. CRUMRINE
INVENTOR
BY
ATTORNEYS Patented July 14, 1942

2,289,827

UNITED STATES PATENT OFFICE 2,289,827

FILM WINDING AND INDICATING MECHANISM

Chester W. Crumrine, Rochester, N. Y., assignor to Eastman Kodak Company, Rochester, N. Y., a corporation of New Jersey Application January 23, 1941, Serial No. 375,652

11 Claims. (Cl. 95—31)

This invention relates to photography and more particularly to photographic cameras. One object of my invention is to provide a camera with an automatic film measuring means and with an automatic film winding control. Another object is to provide a mechanism for measuring a predetermined series of film areas before releasing the mechanism for winding the tail strip of protective paper on the film. Another object is to provide an automatic device of the character described in which film of different lengths can be properly measured and wound. Other objects will appear from the following description in the specification, the novel features being particularly pointed out in the claims at the end thereof.

Coming now to the drawings in which like reference characters denote like parts throughout:

Fig. 1 is a top plan view of a camera having this exposure indicator applied in its entirety;

Fig. 2 is a vertical sectional elevation, enlarged, taken substantially on line 2—2 of Fig. 1;

Fig. 3 is a similar view with certain parts displaced;

Fig. 4 is a perspective of a group of associated parts slightly separated for clarity of illustration;

Figs. 5 and 6 are top views of the parts shown in Fig. 4 in different positions;

Fig. 7 is a plan view, enlarged, of the camera of Fig. 1, some parts being shown as if the casing were broken away in different planes;

Fig. 8 is a side elevation of parts shown in Fig. 2;

Fig. 9 is a plan view of the counter dials and other associated parts;

Fig. 10 is a section on line 10—10 of Fig. 7;

Figs. 11 and 12 show the observation window with counter numerals visible therein under different operating conditions; and Fig. 13 is a detached view of one part shown in Fig. 4.

In the past cameras have been provided with automatic film measuring devices which would measure a given number of exposures, but so far as I am aware it has not been suggested that such a camera should automatically indicate and measure two different length films before automatically releasing the measuring mechanism and winding the trailer protective paper thereon. In fact, one difficulty has been that if a different length film from that for which the camera is designed is used, known structures have not functioned properly.

My invention is directed to overcoming the usual difficulties of having the measuring and indicating mechanism get out of phase when two different sized films are used. For instance, my mechanism will function properly for different lengths of films such as either six or eight-exposure film. Black and white film is usually furnished in standard eight exposure rolls and color film in standard six exposure rolls.

My camera is designed to automatically care for either after manually setting a dial upon starting. My improved camera also indicates the type film with which the camera is loaded.

The camera shown herewith is in most respects identical with that illustrated in my copending application Serial No. 378,235, filed February 10, 1941. Such a camera, having a body 1 and a hinged back or cover 2, may be provided with a supply spool 3 and a wind-up spool 4 so that film may be drawn across a framing aperture 5. A "screw-out" front assembly may comprise an inner threaded nonrevoluble tube member 6 and an outer member 7 threaded to turn in the body 1, a shutter and lens element 8, and an operating arm 9 for the shutter. This arm may be engaged by a lever 10 pivoted at 11 on a bracket 11a in the tube 6, and is designed so that when the lever 10 is moved counter-clockwise by a sliding frame 12 the shutter is cocked and when a second sliding plate 13 moves against the end 10a the arm 10 is swung clockwise and the shutter is released. The release is accomplished by movement of a link 14 that is moved to the left whenever a bellcrank 15 pivoted at 16 on a bracket 17 depending from a plate 18 is operated by a manually-operable plunger 19. A spring so normally retracts the link 14 and the release plate 13. A second spring 21 tends to swing lever 10 clockwise. Focusing of the lens may be accomplished by rotating the tube 7 by means of a ferrule 22 or by a knob 23 that is geared to tube 7 at 24. The tube 6 is held against rotation by suitable guides and is capable only of forward and backward movement.

A roller 25, carried by an arm 26, moves the frame 12 to the right when a gear 28 is rotated. When the toothed portion of gear 28 is meshed with a gear 31 that is keyed at 32 to a spindle 30 operated by a knob 29, the gear 28 will turn counter-clockwise until a pin 59 on its underside engages a shoulder on a pivoted arm 57. Gear 31 is turned as film passes to the spool 4, until stopped by engagement with a lug 45 on a lever 42, having a slot 43 which permits the lever to have a limited transverse sliding movement and to turn about a pivot 44. Normally the lug 45 rides on the periphery of a disk 36 that is turned by frictional engagement with a gear 34, but when a notch 46 in the disk becomes aligned with the lug 45 the latter drops into the notch and engages the gear 31, which, as it is positively rotated clockwise by knob 29, moves lever 42 to the right. All of the above, and other parts presently to be described, are all concerned with a double-exposure prevention mechanism which actually forms no part of the present invention but is shown, nevertheless, as it is associated with parts of the mechanism which do involve the exposure counter.

The movement of the lever 42 as just described causes its right end 50 to push a spring 51 out of a notch 52 in the plunger 19 into which the spring 51 returns when lever 42 is moved to the left by a spring 47. When spring 51 is in notch 52 the plunger 19 cannot be depressed and the shutter release plate 13 cannot be moved to release the shutter. When lever 42 is in the position shown in Fig. 7 the plunger may be depressed and in fact in this figure is shown depressed, so that plate 13 is about to strike the lug 10a on the inner end of lever 10. At this point the link 14 has turned a lever 53 about a pivot 54 so that its rear end 55 swings the lever 42 and raises the lug 45 out of notch 46 until a spring catch 48 which is part of lever 42 is moved off from a stud 49. The lever 42 is then returned to the left, as above mentioned, by means of the spring 47, as far as slot 43 will permit.

The frictionally-driven disk 36 above referred to derives its movement from a gear 34 with which it is held in frictional contact (Fig. 2) by a spring 35, adjustable by nuts 37 threaded on an upward extension or sleeve 34a of gear 34. Gear 34 is driven by a pinion 38 and the latter is driven by a shaft 40 on which is a toothed wheel 41 that is engaged and driven in a well-known manner by the film passing to the winding spool 4.

The drawings (Fig. 7) show an intercepting catch 75, pivoted at 76 and having upwardly and downwardly extending arms 78 and 80 respectively, which is urged by a spring 77 toward the pinion 39. This catch is described in the copending application hereinbefore mentioned and is for the purpose of preventing tampering with the double-exposure prevention mechanism when the camera is opened. A flange 79 on the back 2 disengages the lug 78 from pinion 39. This catch is described in the copending application hereinbefore mentioned and is for the purpose of preventing tampering with the double-exposure prevention mechanism when the camera is opened. A flange 79 on the back 2 disengages the lug 78 from pinion 39 when the back is closed. A roller clutch 30a permits the spindle 30 to be turned only in a clockwise direction.

The exposure-counting device, Figs. 4, 5, 6 and 9, includes a disk 61 bearing suitable numerals corresponding to the successive exposure areas of a roll of film. In the present instance these numerals run from 0 to 8 corresponding to those on a standard film roll. These numerals become visible in succession through a window 61a in the top of the camera as the disk is revolved, and one half 61b of this window is preferably tinted to distinguish it from the clear portion 61c (Figs. 11 and 12) such as by a red or other colored translucent dye.

The disk 61 and a spring washer 85 are arranged to turn with a sleeve 66 that enters the top wall of the camera (Figs. 2 and 3), the lower end of the knob being of the irregular shape indicated, and the disk and washer having openings of corresponding contour. The bottom of the sleeve 66 is spun over to retain these parts in place, and to support between the disk and the washer a plate 62, which is the well-known Geneva gear with notches 63 in its periphery, corresponding in number to the numerals on disk 61. The plate 62 is provided with an aperture 62a into which project opposite prongs 62b, whereby limited rotation of plate 62 may be permitted, this rotation being limited by the distance the prongs may travel between lobes 66b of the sleeve 66.

The sleeve 66 is supported and guided on a stud fixed on the mechanism plate 18 of the camera, and a spring 66a normally holds the sleeve, the disk 61, washer 85 and plate 62 in the position of Fig. 2, in which one of the notches 63 is engaged by a pin 64 or driver projecting downwardly from a disk 65 that is fixed on the upper end of a sleeve portion 36a of disk 36. A second disk 87 is also fixed to the sleeve portion 36a and is of such a diameter that it just abuts the portions 62a between the notches 63 and thereby holds plate 62 against rotation until the pin 64 enters one of the notches 63 as said pin turns with disk 36.

If now the film is being wound onto the spool 4 the toothed wheel 41 is turned by reason of its engagement with the surface of the film or with notches therein and the gear 34 is rotated by means of pinions 38 and 39. The disk 36, being constantly pressed by spring 35 into frictional engagement with gear 34, is also rotated and when pin 64 engages one of the notches 63 the plate 62 is moved counter-clockwise one-ninth of a revolution, which carries the digit on disk 61 which was visible through the clear portion 61c of window 61a out of sight, and the next digit moves into view. Thus each revolution of disk 36, or the advancement of one film exposure area, moves the disk 61 one digit by reason of the frictional engagement between plate 62, disk 61 and washer 85.

After the last film area is exposed, it is necessary to wind off the trailer or backing paper, and therefore the exposure-counter must be thrown out of action. To this end a pin 67 (Fig. 9) projecting from the bottom of plate 62 strikes a lever 68, and against the action of a spring 69 moves this lever so that its left end 70 intercepts a pin 71 on disk 36. Pin 71 is so located that when intercepted the lug 45 cannot enter notch 46 and therefore the rotation of spindle 30 cannot be blocked, that is, lug 45 cannot engage gear 31. The operator can then turn knob 29 and finish winding the backing paper and insert a fresh roll of film.

After the new roll is inserted the parts are still in the position of Fig. 9, so the operator winds on the leader strip or the backing paper until numeral 1 appears in the usual inspection window W in the camera back 2. During this period lug 45 rests against the periphery of disk 36 and the pin 71 is still intercepted by end 70 of lever 68. Then, by depressing sleeve 66, the plate 62, now disengaged from pin 64, may be rotated by turning sleeve 66 and the numeral 1 may be brought under the clear portion 61c of the window 61a. This partial rotation carries pin 67 past the tail-end of lever 68, and spring 69 immediately withdraws the end 70 from its intercepting position ahead of pin 71 and a slight further rotation of knob 29 carries notch 46 into engagement with lug 45 and permits the latter to engage gear 31. A still further rotation of knob 29 causes gear 31 to move lever 42 to the right, forcing spring 51 out of notch 52 in plunger 19, and the camera is then ready for the first exposure. Each revolution of disk 36 thereafter advances disk 61 one digit until numeral 8 is again in the position of Fig. 9.

It should be clearly understood that when sleeve 66 is depressed the plate 62 is disengaged from pin 64 and if the sleeve is then rotated all three parts 61, 62 and 85 rotate therewith, because plate 62 is gripped frictionally against disk 61 by spring washer 85 the latter carries nubs 85a that snap into a pair of corresponding depressions 85b in the bottom of plate 62 to increase the tendency of the disks and the washer to maintain their angular relation. There are two pairs of these depressions in the present instance, the two nubs of a pair being 180° apart and the two pairs being as many degrees apart as the angular distance apart of the two prongs 62b, less the thickness of one lobe 66b, for a reason presently to be made clear.

However, if sleeve 66 is turned without being depressed, if any notch 63 in plate 62 is engaged with pin 64, the disk 61 and washer 85, being fitted to the lobed end of the sleeve 66 must turn with the latter, while the plate 62 cannot turn by reason either of its engagement with pin 64 or because one portion of its periphery between the notches 63 abuts the disk 87. Therefore, the original between the numerals on disk 61 and the plate 62 may be changed, within the limits established by the proportions of prongs 85b and lobes 66b.

The conditions outlined above are utilized when it is desired to use a six-exposure roll of film in the camera. So that the user may know that a six-exposure roll is in the camera it may be desirable to have the indicating numerals therefor present a different appearance than for an eight-exposure roll. To this end, the window 61a has a tinted portion 61b. When the operator desires to use a six-exposure roll, he merely turns the sleeve 66 clockwise as far as it can be turned, being careful not to depress it. This turning causes disk 61 and washer 85 to move from the position of Fig. 5 to the relation shown in Fig. 6, viz., all numerals have been moved clockwise in the present instance, 100 degrees or two digit spaces plus one-half a space. Then if the operator depresses the sleeve 66, the whole assembly (61, 62, 85) may be turned as desired, because this movement frees the plate 62 from the pin 64. When the sleeve 66 has been turned to bring numeral 1 under the portion 61b of window 61a the film is ready for the first exposure and when the sixth exposure has been made the pin 67 will move lever 68 to intercept pin 71 as before, and the backing paper or trailer then may be wound on spool 4.

If the next film is one of eight exposures, the above procedure is reversed, viz., the sleeve 66 is turned counterclockwise as far as possible without depressing it and then it may be depressed and reset to exhibit numeral 1 in the clear window space 61c.

I claim:

1. In a roll holding camera including a camera body having an exposure frame, roll holders for supporting and winding film and backing paper from one spool to another and across the exposure frame, said camera being adapted to receive spools of film having different and known numbers of exposures thereof, the combination with a film winding handle, mechanism connected thereto for winding one exposure at a time across the exposure frame, a latch included in the film winding mechanism for stopping the film winding mechanism after a fresh area of film has been wound into place, a film exposure counting mechanism registering the number of exposures, and means operable by the exposure counting mechanism for holding said latch inoperative after a predetermined number of exposures are counted, and means for setting the exposure counting mechanism for different numbers of exposures whereby said means operable by the exposure counting mechanism may hold the latch inoperative and backing paper may be wound after the last exposure has been made on the selected film.

2. In a roll holding camera including a camera body having an exposure frame, roll holders for supporting and winding film and backing paper from one spool to another and across the exposure frame, said camera being adapted to receive spools of film having different and known numbers of exposures thereof, the combination with a film winding handle, mechanism connected thereto for winding one exposure at a time across the exposure frame and including a latch and a movable cam attached to the winding mechanism, said latch being positioned to engage and stop the winding of said mechanism for each exposure, an exposure counter including a dial mounted to move relative thereto to indicate the number of exposures made, a stop pin on the exposure counter, a stop lever movably mounted in the path of the stop pin when the exposures have all been made to be moved thereby to hold said latch from the movable cam whereby the film wind may continue to function as long as the film winding handle is turned to wind film and backing paper.

3. In a roll holding camera including a camera body having an exposure frame, roll holders for supporting and winding film and backing paper from one spool to another and across the exposure frame, said camera being adapted to receive spools of film having different and known numbers of exposures thereof, the combination with a film winding handle, mechanism connected thereto for winding one exposure at a time across the exposure frame, and including a latch and a movable cam attached to the winding mechanism, said latch being positioned to engage and stop the winding of said mechanism for each exposure, an exposure counter including a dial mounted to move relative to indicate the number of exposures made, a snap latch between the exposure counter and the dial adapted to hold these parts in different selected positions, a stop pin on the exposure counter, a stop lever movably mounted in the path of the stop pin to be moved thereby when all exposures registered by the dial have been made to hold said latch from the movable cam whereby the film wind may continue to function after the selected number of exposures as indicated by the dial have been made and as long as the film winding handle is turned to wind film and backing paper.

4. In a roll holding camera including a camera body having an exposure frame, roll holders for supporting and winding film and backing paper from one spool to another and across the exposure frame, said camera being adapted to receive spools of film having different and known numbers of exposures thereof, the combination with a film winding handle, mechanism connected thereto for winding one exposure at a time across the exposure frame, and including a latch and a movable cam attached to the winding mechanism, said latch being positioned to engage and stop the winding of said mechanism for each exposure, an exposure counter including a dial, graduations on said dial to indicate the number of exposures of a selected film, said dial being mounted to move relative thereto, a snap latch element between the exposure counter and the dial plate adapted to hold these parts in different selected positions, a handle for selecting the relative position of the exposure counter and dial plate, and movable means including a pivoted lever adapted to move into a position to prevent the said latch from operatively engaging the cam after a complete film area has been wound into place whereby said backing paper may be wound after a selected number of exposures have been automatically wound across said exposure frame.

5. In a roll holding camera including a camera body having an exposure frame, roll holders for supporting and winding film and backing paper from one spool to another and across the exposure frame, said camera being adapted to receive spools of film having different and known numbers of exposures thereof, the combination with a film winding handle, mechanism connected thereto for winding one exposure at a time across the exposure frame, and including a latch and a movable cam attached to the winding mechanism, said latch being positioned to engage and stop the winding of said mechanism for each exposure, an exposure counter including a dial mounted to move relative thereto, graduations on said dial for indicating the number of exposures made, a snap latch element between the exposure counter and the dial plate adapted to hold these parts in different selected positions, a handle for selecting the relative position of the exposure counter and dial plate, a shaft carried by the handle and carrying both the dial plate and the exposure counter, a spring washer holding the said snap latch elements in frictional engagement and movable means including a pivoted lever positioned for actuation by the exposure counter adapted to move into a position to prevent the said latch from operatively engaging the cam after a last film area of a selected film has been wound into place whereby said backing paper may be wound after a selected number of exposures have been automatically wound across said exposure frame.

6. In a roll holding camera including a camera body having an exposure frame, roll holders for supporting and winding film and backing paper from one spool to another and across the exposure frame, said camera being adapted to receive spools of film having different and known numbers of exposures thereof, the combination with a film winding handle, mechanism connected thereto for winding one exposure at a time across the exposure frame, and including a latch and a movable cam attached to the winding mechanism, said latch being positioned to engage and stop the winding of said mechanism for each exposure, an exposure counter including a dial having graduations for indicating the number of exposures, said dial being mounted to move relative thereto, a snap latch element between the exposure counter and the dial plate adapted to hold these parts in different selected positions according to the number of exposures on the selected film, a handle for selecting the relative position of the exposure counter and dial plate, a shaft carried by the handle and carrying coaxially thereon the exposure counter and dial plate, a spring also carried by the shaft and holding said snap latch elements in a selected position, said shaft including an offset lug, the exposure counter including a shaft engaging opening encircling said offset lug and an inwardly extending pin carried by the exposure counter positioned to permit said exposure counter to move a limited distance on said shaft, and movable means including a pivoted lever positioned to be engaged by said exposure counter adapted to move into a position to prevent the said latch from operatively engaging the cam after a film area has been wound into place whereby said backing paper may be wound after a selected number of exposures have been automatically wound across said exposure frame.

7. In a roll holding camera including a camera body, an exposure frame and roll holders for supporting and winding film and backing paper from one spool to another and across the exposure frame, said camera being adapted to receive spools of film having different and known numbers of exposures thereof, the combination with a film winding mechanism including a measuring roll, a winding handle and a latch to automatically stop the winding when an exposure area of film is wound into position for exposure, of a Geneva gear for controlling the number of exposures, a dial movably mounted with respect to the Geneva gear for indicating the number of exposures, means tending to hold the dial in either of two positions relative to the Geneva gear, a stop pin carried by the geneva, and a stop lever lying in the path of the stop pin and adapted to be actuated thereby to prevent the operation of the latch for stopping the movement of the film winding device whereby the backing paper may be wound up after a predetermined number of exposures are completed.

8. In a roll holding camera including a camera body, an exposure frame and roll holders for supporting and winding film and backing paper from one spool to another and across the exposure frame, said camera being adapted to receive spools of film having different and known numbers of exposures thereof, the combination with a film winding mechanism including a measuring roll, a winding handle and a latch to automatically stop the winding when an exposure area of film is wound into position for exposure, of a Geneva gear and driver for measuring the number of exposures to be automatically positioned for exposure at the exposure frame, said film winding mechanism carrying said driver, a shaft carrying the Geneva gear, means including said shaft for moving the Geneva gear axially to disengage the driver for setting the Geneva gear when a fresh film having a known number of exposures is inserted into the camera, an exposure counting dial plate movably mounted with respect to said geneva, and means for normally turning the dial plate with the geneva, exposure numerals carried by the dial plate, and a window in the camera through which the exposure numerals may be read.

9. In a roll holding camera including a camera body, an exposure frame and roll holders for supporting and winding film and backing paper from one spool to another and across the exposure frame, said camera being adapted to receive spools of film having different and known numbers of exposures thereof, the combination with a film winding mechanism including a measuring roll, a winding handle and a latch to automatically stop the winding when an exposure area of film is wound into position for exposure, of a Geneva gear and driver for measuring the number of exposures to be automatically positioned for exposure at the exposure frame, said film winding mechanism carrying said driver, a shaft carrying the Geneva gear, means including said shaft for moving the Geneva gear axially to disengage the driver for setting the Geneva gear when a fresh film having a known number of exposures is inserted into the camera, an exposure counting dial plate movably mounted with respect to said geneva, and means for normally turning the dial plate with geneva, exposure numerals carried by the dial plate, and a window in the camera through which the exposure numerals may be read, means for dividing the window into two sections, one section for indicating one type of film having a given number of exposures and the other section for designating another type of film having a different number of exposures, said dial plate being movable to indicate exposures in either of the two window sections to designate the type of film loaded in the camera.

10. In a roll holding camera including a camera body, an exposure frame and roll holders for supporting and winding film and backing paper from one spool to another and across the exposure frame, said camera being adapted to receive spools of film having different and known numbers of exposures thereof, the combination with a film winding mechanism including a measuring roll, a winding handle and a latch to automatically stop the winding when an exposure area of film is wound into position for exposure, of a Geneva gear for controlling the number of exposures which may be automatically wound for exposure, a driver connected to the film winding mechanism and engaging the Geneva gear for moving the latter one step for each exposure, a dial plate movably carried by the geneva, means normally holding the dial plate in a fixed position relative to the geneva, graduations on the dial plate for indicating the number of exposures, a two part window in the camera located above the dial plate through either part of which a graduation on the dial plate may be viewed, a handle for axially moving the Geneva gear to set it relative to the driver, and connections between said handle and dial plate for moving the dial plate relative to the geneva whereby films of different types having different numbers of exposures may be measured for a predetermined number of exposures, and means actuated by the Geneva gear for preventing the operation of the film winding mechanism latch after a predetermined number of exposures measured by the Geneva gear have been measured whereby the backing paper may be wound past the exposure aperture.

11. In a roll holding camera including a camera body, an exposure frame and roll holders for supporting and winding film and backing paper from one spool to another and across the exposure frame, said camera being adapted to receive spools of film having different and known numbers of exposures thereof, the combination with a film winding mechanism including a measuring roll, a winding handle and a latch to automatically stop the winding when an exposure area of film is wound into position for exposure, of a Geneva gear for controlling the number of exposures, a driver connected to the film winding mechanism and engaging the Geneva gear for moving the latter one step for each exposure, a dial plate movably carried by the geneva, means normally holding the dial plate in a fixed position relative to the geneva, graduations on the dial plate indicating the number of exposures, a two part window in the camera located above the dial plate through either part of which a graduation on the dial plate may be viewed, a handle for axially moving the Geneva gear to set it relative to the driver, and connections between said handle and dial plate for moving the dial plate relative to the geneva whereby films of different types having different numbers of exposures may be measured for a predetermined number of exposures, means actuated by the Geneva gear for preventing the operation of the film winding mechanism latch after a predetermined number of exposures measured by the geneva whereby the film backing paper may be continuously wound across the exposure aperture, a window in the camera for viewing the usual numerals on the film backing paper whereby a film may be wound into position for the first exposure determined by winding the backing paper to the proper position as viewed through the window, said handle, by setting the dial plate and geneva for a fresh film having a known number of exposures moving the means actuated by the geneva for measuring film whereby the latch may again control the film winding mechanism for presenting successive exposure areas of film at the exposure aperture.

CHESTER W. CRUMRINE.

CERTIFICATE OF CORRECTION.

Patent No. 2,289,827.                                      July 14, 1942.

CHESTER W. CRUMRINE.

It is hereby certified that error appears in the printed specification of the above numbered patent requiring correction as follows: Page 3, second column, line 56, claim 3, after "relative" insert --thereto--; and that the said Letters Patent should be read with this correction therein that the same may conform to the record of the case in the Patent Office.

Signed and sealed this 1st day of September, A. D. 1942.

(Seal)                                            Henry Van Arsdale,
                                                   Acting Commissioner of Patents.